United States Patent

Sato et al.

[11] Patent Number: 5,181,141
[45] Date of Patent: Jan. 19, 1993

[54] ANTI-REFLECTION OPTICAL ELEMENT

[75] Inventors: Koji Sato, Akigawa; Tokio Suzuki, Sagamihara; Hajime Kamiya, Kokubunji; Kimio Nakamura, Musashimurayama; Masahisa Kosaka; Tetsuo Ohsora, both of Nishitama, all of Japan

[73] Assignee: Hoya Corporation, Tokyo, Japan

[21] Appl. No.: 839,684

[22] Filed: Feb. 24, 1992

Related U.S. Application Data

[63] Continuation of Ser. No. 499,686, Mar. 27, 1990, abandoned.

[30] Foreign Application Priority Data

Mar. 31, 1989 [JP] Japan .................................. 1-083391
Apr. 28, 1989 [JP] Japan .................................. 1-111499

[51] Int. Cl.⁵ .......................... G02B 1/10; G02B 5/28
[52] U.S. Cl. .................................... 359/580; 359/581; 359/582; 427/164
[58] Field of Search .................. 350/164, 165, 166; 359/580, 581, 582, 586; 427/164

[56] References Cited

U.S. PATENT DOCUMENTS

| | | | |
|---|---|---|---|
| 3,934,961 | 1/1976 | Itoh et al. | 350/164 |
| 4,132,919 | 1/1979 | Maple | 350/166 |
| 4,749,255 | 6/1988 | Chakrabarti et al. | 350/166 |
| 4,765,729 | 8/1988 | Taniguchi | 350/165 |
| 4,784,467 | 11/1988 | Akatsuka et al. | 350/166 |
| 4,802,737 | 2/1989 | Denton | 350/166 |

FOREIGN PATENT DOCUMENTS

| | | |
|---|---|---|
| 46-4759 | 11/1971 | Japan . |
| 55-22704 | 2/1980 | Japan . |
| 56-116003 | 9/1981 | Japan . |
| 60-199016 | 10/1985 | Japan . |

*Primary Examiner*—Martin Lerner
*Attorney, Agent, or Firm*—Nixon & Vanderhye

[57] ABSTRACT

The anti-reflection optical element of the present invention achieves reduction of surface reflection by providing a multi-layered anti-reflection film directly or indirectly on an optical component made of a plastic. The anti-reflection optical element of the present invention uses a multi-layered anti-reflection film comprising at least one high refractive index film layer which is a film of mixed metal oxides comprising tantalum oxide, zirconium oxide and yttrium oxide deposited by evaporation process, and thereby has solved the problems of conventional anti-reflection optical elements that their optical, mechanical and chemical properties are deteriorated with the lapse of time.

11 Claims, 3 Drawing Sheets

ANTI-REFLECTION OPTICAL ELEMENT

This is a continuation-in-part of application Ser. No. 07/499,686, filed Mar. 27, 1990, now abandoned.

BACKGROUND OF THE INVENTION

1. Field of the Invention

The present invention relates to an optical element used as an optical lens (e.g. opthalmic lens, camera lens), a filter, a polarizer, a semitransparent mirror, etc. and particularly to an anti-reflection optical element with reduced surface reflection.

2. Description of Prior Art

As the material for an optical element, there have conventionally been used mainly inorganic glasses. In recent years, however, plastics have gained wide acceptance as said material, because they are lightweight and superior in impact resistance, tintability, etc. Plastics are being increasingly used particularly as a material for opthalmic lenses because they have excellent tintability and can meet a requirement in fashion aspect, of using a large-sized frame and a color lens in combination.

As the plastics used as a material for optical element, particularly opthalmic lens, the resins obtained by cast-polymerizing diethylene glycol bis(allyl carbonate) (hereinafter referred to as DAC) are in general use. Polyurethanes which have a higher refractive index than the refractive index (1.500) (these refractive indexes are relative to the d-line of Fraunhofer lines and hereinafter referred to as nd) of the DAC resins and are lightweight, are also in use as a lens material, as described in, for example, Japanese Patent Publication Kokai (Laid-Open) No. 199016/1985. The polyurethanes have excellent impact resistance, good tintability, a high nd (1.56-1.64) and a small specific gravity (1.22-1.44), and accordingly are suitable as a material for a thin and light optical lens.

The surface reflection in optical elements causes reduction in transmittance of the optical system and increase in light not contributing to image information, thereby lowering image contrast. Therefore, optical elements made of an inorganic glass as well as those made of a plastic have, in many cases, an anti-reflection film thereon to reduce the surface reflection. In the optical elements made of a plastic, an anti-reflection film is formed usually on an abrasion resistance film provided on an optical component in order to improve the mar resistance. In this case, a foundation layer is provided as necessary between the abrasion resistance film and the anti-reflection film in order to improve the adhesion between the two films. Also there is a case wherein a foundation layer is provided on an optical component and an anti-reflection film is provided on the foundation layer.

Such an anti-reflection film is formed usually as a vapor-deposited film of metal(s) or metal oxide(s), and is largely divided into a single-layered anti-reflection film and a multi-layered anti-reflection film the latter being obtained by laminating a low refractive index film layer and a high refractive index film layer by turns. Both the single-layered anti-reflection film and the multi-layered anti-reflection film are required to have excellent optical properties (e.g. desired refractive index, optical uniformity, excellent transparency), excellent mechanical properties (e.g. excellent mar resistance, excellent adhesion) and excellent chemical properties (e.g. excellent acid resistance, excellent heat resistance).

As the anti-reflection film provided on an optical element made of an inorganic glass, there are known, for example, a multi-layered anti-reflection film comprising a high refractive index vapor-deposited film layer obtained from a mixed material consisting of Zr and Ta (at least one of them takes an oxide form), disclosed in Japanese Patent Publication Kokai (Laid-Open) No. 4759/1971; a multi-layered anti-reflection film comprising a high refractive index vapor-deposited film layer obtained from a mixed material consisting of $Ta_2O_5$ and $ZrO_2$, disclosed in Japanese Patent Publication Kokai (Laid-Open) No. 22704/1980; and a multi-layered anti-reflection film comprising a high refractive index vapor-deposited film layer obtained by using $ZrO_2$ as a material. Of these films, the multi-layered anti-reflection film comprising a high refractive index vapor-deposited film layer obtained by using $ZrO_2$ as a material is in primary use. Meanwhile, in optical elements made of a plastic, the formation of an anti-reflection film cannot be conducted at high optical component temperatures as in optical elements made of an inorganic glass, and there are used a multi-layered anti-reflection film comprising a high refractive index vapor-deposited film layer obtained by using $ZrO_2$ as a material, because the multi-layered anti-reflection film, even when formed at low temperatures, has excellent transparency and a high refractive index as disclosed in Japanese Patent Publication Kokai (Laid-Open) No. 11603/1981.

However, the multi-layered anti-reflection film comprising a high refractive index vapor-deposited film layer obtained by using $ZrO_2$ as a material, when formed on an optical component (e.g. plastic) whose temperature cannot be raised relatively high, shows practically an unacceptable decrease in heat resistance with the passage of time. As a result, in conventional anti-reflection optical elements whose optical components is made of a plastic, there has been a problem that their optical, mechanical and chemical properties are deteriorated with the lapse of time because the heat resistance of the multi-layered anti-reflection film is deteriorated with the lapse of time.

SUMMARY OF THE INVENTION

Therefore, the object of the present invention is to solve the above problem and provide an anti-reflection optical element whose optical component is made of a plastic and which possesses excellent optical, mechanical and chemical properties as well as improved durability in said properties.

The present invention has been made to achieve the above object. The anti-reflection optical element of the present invention comprises (i) an optical component made of a plastic and (ii) a multi-layered anti-reflection film provided directly or indirectly on said optical component and containing at least one high refractive index film layer which is a film of mixed metal oxides comprising tantalum oxide, zirconium oxide and yttrium oxide, deposited by an evaporation process.

DETAILED DESCRIPTION OF THE INVENTION

Figure 1:
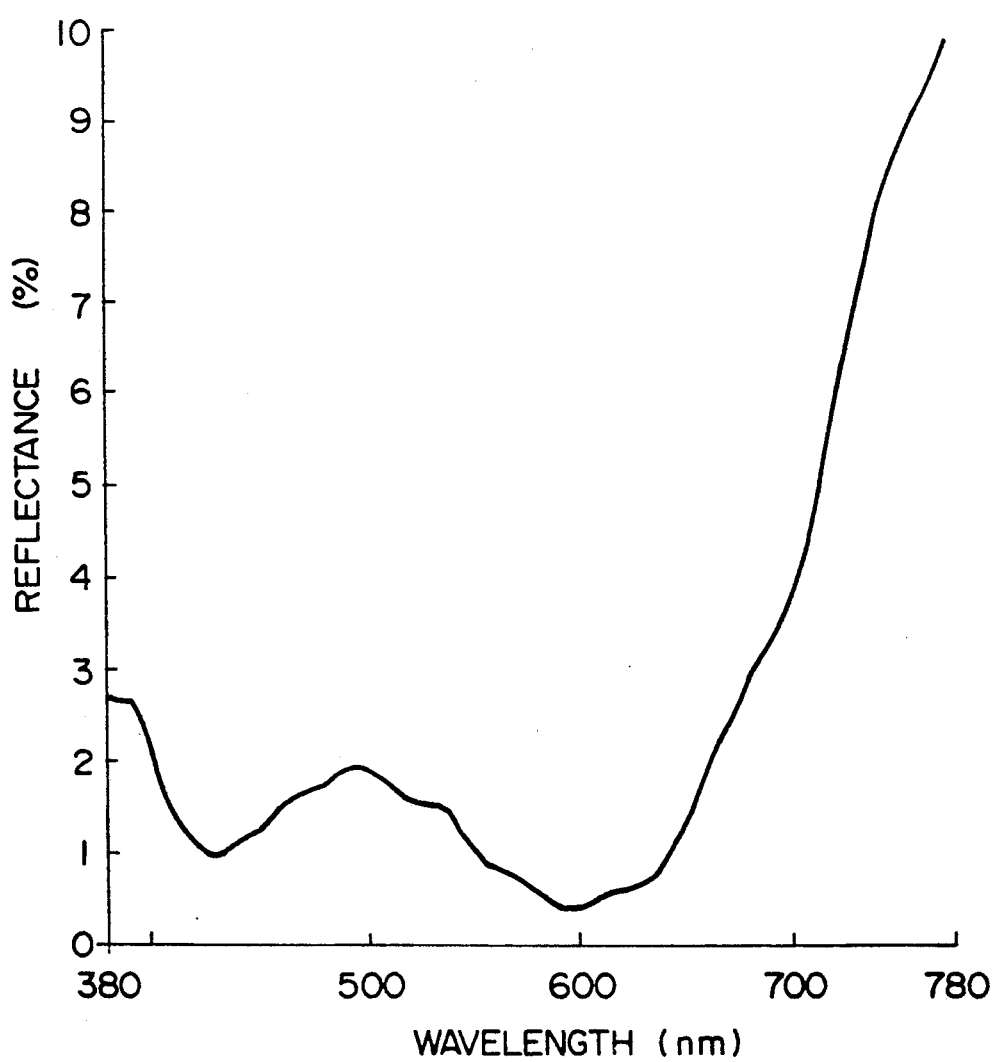
FIG. 1 shows a spectral reflectance curve of the anti-reflection optical element obtained in Example 19.

As mentioned above, the anti-reflection optical element of the present invention comprises (i) an optical component made of a plastic and (ii) a multi-layered anti-reflection film provided directly or indirectly on said optical component and comprising at least one high refractive index film layer which is a film of mixed metal oxides comprising tantalum oxide, zirconium oxide and yttrium oxide, deposited by an evaporation process.

In the anti-reflection optical element of the present invention, the plastic constituting the optical component on which a multi-layered anti-reflection film is provided has no particular restriction as long as it can be used as a material for an optical element, but typically includes the following.

(1) Polyurethanes obtained by polymerizing a polyisocyanate and at least one compound selected from compounds having two or more mercapto groups [the compounds are hereinafter referred to as compounds (A)], compounds having two or more hydroxyl groups [the compounds are hereinafter referred to as compounds (B)] and compounds having one or more mercapto groups and one or more hydroxyl groups [the compounds are hereinafter referred to as compounds (C)].

(2) DAC resins.

(3) Copolymers of DAC and at least one monomer. For example, said monomer is selected from benzyl (meth)acrylate, diallyl tere- and/or isophthalate and methyl (meth)acrylate.

(4) Copolymers containing an acrylic acid ester and/or a methacylic acid ester as essential monomers [the copolymers may contain other vinyl monomer(s) as optional monomer(s)].

(5) Polyesters including alkyl resins, unsaturated polyester resins, etc.

(6) Various amino resins including melamine resins, urea resins, etc.

(7) Polycarbonates.

(8) Polyvinyl acetate.

(9) Polyvinyl alcohol.

(10) Polystyrene.

Among the above mentioned plastics, the polyurethanes (1) are most preferable because of their high refractive index and high impact resistance.

The polyisocyanate used as a monomer for production of the polyurethanes (1) has no particular restriction, and includes polyisocyanate compounds such as tolylene diisocyanate, diphenylmethane diisocyanate, polymeric diphenylmethane diisocyanate, naphthylene diisocyanate, hexamethylene diisocyanate, isophorone diioscyanate, hydrogenated xylylene diisocyanate, hydrogenated diphenylmethane diisocyanate, lysine diisocyanate, triphenylmethane triisocyanate, tris-(isocyanatophenyl) thiophosphate, trans-cyclohexane-1,4-diisocyanate, p-phenylene diisocyanate, tetramethylene diisocyanate, 1,6,11-undecane triisocyanate, 1,8-diisocyanate-4-isocyanate methyloctane, lysine ester triisocyanate, 1,3,6-hexamethylene triisocyanate, bicycloheptane triisocyanate and the like, as well as their allophanate, biuret or isocyanurate derivatives and their addition products with a polyol or a polythiol. As the polyisocyanate, there can also be mentioned o-xylylene diisocyanate, m-xylylene diisocyanate, p-xylylene diisocyanate, tetramethyl-p-xylylene diisocyanate, tetramethyl-m-xylylene diisocyanate, and their nucleus-chlorinated, brominated, methylated, or ethylated products such as 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate and the like. These polyisocyanates can be used alone or in combination of two or more.

As the compounds (A) to be reacted with the polyisocyanate, there can be mentioned, for example, ethanedithiol, propanedithiol, propanetrithiol, butanedithiol, pentanedithiol, hexanedithiol, heptanedithiol, octanedithiol, cyclohexanedithiol, cycloheptanedithiol, 2,5-dichlorobenzene-1,3-dithiol, xylylenedithiol, benzenedithiol, pentaerythritol tetrakis-3-mercaptopropionate, pentaerythritol tetrakisthioglycolate, trimethylolpropane tris(mercaptopropionate), trimethylolethane tris(mercaptopropionate), dichloroneopentyl glycol bis(mercaptopropionate) and dibromoneopentyl glycol bis(mercaptopropionate). Among them, pentaerythritol derivatives are preferable. These compounds (A) can be used alone or in combination of two or more.

As the compounds (B), there can be mentioned, for example, dihydric alcohols such as ethylene glycol, dihydroxydimethyl sulfide and dihydroxydiethyl sulfide; trihydric alcohols such as trihyroxybutane, trihydroxypentane, glycerol trimethyolpropane, tris(2-hydroxyethyl) isocyanurate and the like; tetrahydric alcohols such as tetrahydroxyhexane, pentaerythritol, diglycerol and the like; higher hydric alcohols such as dipentaerythritol and the like. These compounds (B) can be used alone or in combination or two or more.

As the compounds (C), there can be mentioned, for example, mercaptohydroxyethane, glycerol di(mercaptoacetate), 2-mercaptoethanol, 1-hydroxy-4-mercaptocyclohexane, 4-mercaptophenol and 2,4-dimercaptophenol. As the compounds (C), there may also be used a compound ($c_1$) having p hydroxyl groups (p is 0 or an integer of 1 or more) and q mercapto groups (q is an integer of 1 or more) wherein the sum of the number of hydroxyl groups and the sum of mercapto groups, i.e. (p+q) is 3 or more; and 6 or less carbon atoms exist between the furthest two of said groups (furthest two hydroxyl groups, furthest two mercapto groups or furthest hydroxyl and mercapto groups). As the compound ($c_1$), there can be mentioned, for example, monothioglycerol, dimercaptopropanol, 1-mercaptomethyl-1,1-dihydroxymethylpropane, 1,4-dimercapto-2,3-hydroxybutane, mercapto-substituted pentaerythritol and mercapto-substituted sorbitol. The compound (C) can be used alone or in combination of two or more.

The polymerization for obtaining the polyurethane (1) is conducted according to an conventional process. That is, at first a polyisocyanate and at least one compound selected from the compounds (A), the compounds (B) and the compounds (C) are mixed so as to give a molar ratio of NCO/(SH+OH) =0.7 to 1.5, preferably 0.8 to 1.2. Then, the mixture is cast-polymerized in a mold assembly of desired shape consisting of a mold and a resin gasket, to obtain a polyurethane (1).

In obtaining the polyisocyanate (1) by cast polymerization, when there is added to the monomer mixture a phosphoric acid ester of the following general formula as a releasing agent, there can be produced a plastic having an excellent optical surface, a high nd, a large Abbe's number (Abbe's number is hereafter referred to as νd) and accordingly sufficient properties as a material for optical element:

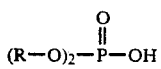

wherein R is an alkyl group of 8 or less carbon atoms).

As the polymerization catalyst used in obtaining the polyurethane (1), tin compounds such as dibutyltin dilaurate, dibutyltin dimaleate and the like are preferable.

The polymerization is effected preferably in such a way that the initial temperature is 5–40° C. and then temperature elevation is made to 100–130° C. in 10–70 hours. When the initial temperature is lower than 5° C., the polymerization takes a longer time, which is inefficient. When the initial temperature is higher than 40° C., the resulting lens tends to be optically nonuniform. When the final temperature is lower than 100° C., unreacted monomers tend to remain, and the resulting polymer has a low polymerization degree and insufficient properties. When the final temperature is higher than 130° C, the resulting lens shows yellowing.

In production of polyurethane (1), the monomer mixture can contain, as necessary, various additives such as light stabilizer, ultraviolet absorber, anti-oxidant, antistatic agent, anti-foaming agent and the like. The polymerization for obtaining a polyurethane (1) may be copolymerization with a radical-polymerizable monomer in order to improve the properties of polyurethane (1).

As the polymerization initiator used in production of DAC resin (2), DAC-containing copolymer (3) (e.g. DAC-benzyl (meth)acrylate copolymer), etc., there can be used a known initiator, and it can be appropriately determined depending upon desired reaction conditions (temperature, time, etc.). As such an initiator, preferable are, for example, 1,1-azobiscyclohexanecarbonate, diisopropyl peroxycarbonate, 1,1'-azobiscyclohexanenitrate and di-tert-butyl peroxide. Various ultraviolet absorbers can also be used in the above production. There are preferably used, for example, 2,2'-dihydroxy-4-methoxybenzophenone and 2-(2'-hydroxy-5'-tertoctylphenyl)benzotriazole.

In the above anti-reflection optical element of the present invention, the multi-layered anti-reflection film provided on the optical component made of a plastic is obtained by laminating a low refractive index film layer and a high refractive index film layer by turns. The high refractive index film layer is a film of mixed metal oxides comprising tantalum oxide, zirconium oxide and yttrium oxide deposited by evaporation process. The low refractive index film layer is preferably a silicon dioxide film, preferably a vapor-deposited film obtained by using $SiO_2$ as a material, in view of the heat resistance.

The film of mixed metal oxides comprising tantalum oxide, zirconium oxide and yttrium oxide, deposited by an evaporation process is preferably obtained by mixing a $ZrO_2$ powder, a $Ta_2O_5$ powder and a $Y_2O_3$ powder, pelletizing the mixture by mechanical pressing and sintering, and subjecting the pellets to electron beam heating to effect vapor deposition. The above oxide mixture preferably has a molar ratio of $ZrO_2$:

$Ta_2O_5$: $Y_2O_3 = 1.0 : 0.8–1.8 : 0.5–0.3$.

The thus obtained vapor-deposited film is very stable chemically similarly to $Ta_2O_5$, as compared with $ZrO_2$, and has a transparency almost equal to that of $ZrO_2$. Moreover, the film has a high refractive index of, for example, 2.05 and is useful from the standpoint of film designing.

When the amount of $Ta_2O_5$ is less than 0.8 mole or more than 1.8 moles per mole of $ZrO_2$, the resulting vapor-deposited film tends to show absorption. When the amount of $Y_2O_3$ is more than 0.3 mole per mole of $ZrO_2$, the rate of vapor deposition is large, the resulting vapor-deposited film tends to show absorption, and the materials for vapor deposition tends to cause splashing, thus making it difficult to control the production of vapor-deposited film.

In the present invention, the multi-layered anti-reflection film preferably consists of two film layers of $\lambda/2$ and $\lambda/4$, or three film layers of $\lambda/4$, $\lambda/4$ and $\lambda/4$ or $\lambda/4$, $\lambda/2$ and $\lambda/4$, for practical purpose. However, it may consist of four or more film layers for required reflection properties. In this case, the first layer (seen from the optical component side) of $\lambda/4$ in the three-layered film may be a three-layered symmetric equivalent film or a two-layered equivalent film, said two equivalent films being formed using the above-mentioned vapor-deposited film of metal oxides and the $SiO_2$ film.

The multi-layered anti-reflection film can also be obtained by employing in place of the above mentioned vacuum deposition process, a sputtering process using the same sintered material as a target, an ion plating process, or the like.

Figure 3:
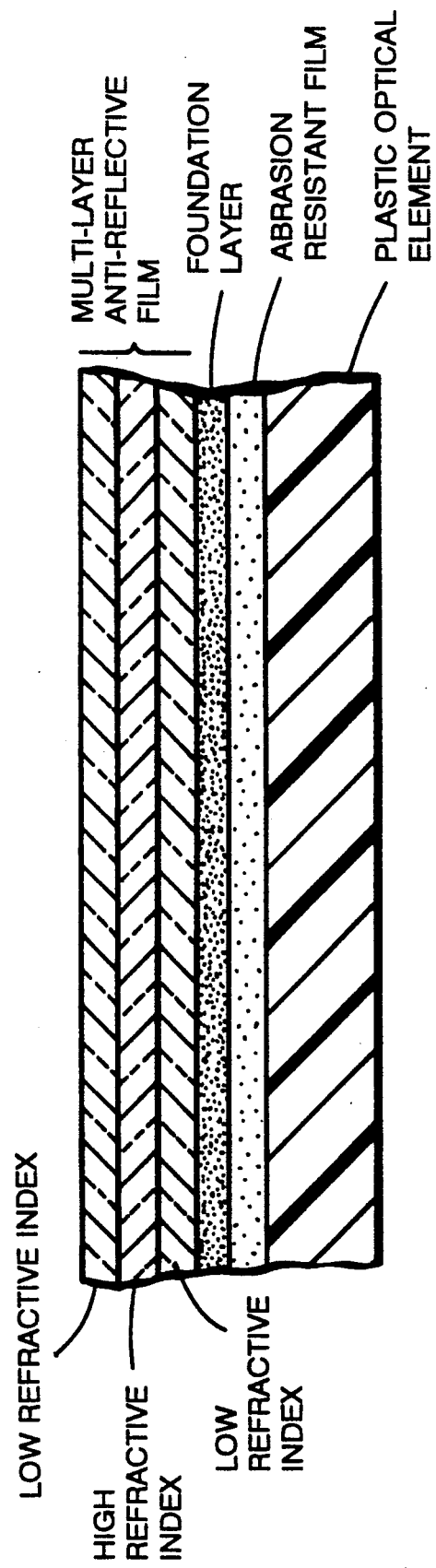
FIG. 3 shows a preferred embodiment of the anti-reflection optical element of the invention.

The multi-layered anti-reflection film can be provided directly on the optical component made of a plastic, or can be provided by firstly providing an abrasion resistance film on the optical component and then providing a multi-layered anti-reflection film on the abrasion resistance film, to obtain an anti-reflection optical element with improved mar resistance as shown in FIG. 3. As the abrasion resistance film, there if preferred one comprising an organosilicon polymer, because it can be formed at relative low temperatures.

The abrasion resistance film comprising an organosilicon polymer can be formed by forming, on the optical component, a layer of a compound selected from compounds having the following general formula and/or their hydrolyzates by a method such as dipping, coating or the like and then curing the layer:

wherein $R_1$ and $R_2$ are independently an alkyl group of 1-10 carbon atoms, an aryl group, a halogenated alkyl group, a halogenated aryl group, an alkenyl group, an epoxy group, a (meth)acryloxy group, a mercapto group, or an cyano group-containing organic group and are bonded to Si in the form of Si-C bond; $R_3$ is an alkyl group of 1-6 carbon atoms, an alkoxyalkyl group or an acyl group; a and b are independently 0, 1 or 2; and (a+b) is 1 or 2.

As the compound represented by the above general formula, there can be mentioned trialkoxysilanes or triacyloxysilanes such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltracetoxysilane, vinyltrimethoxyethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltripropoxysilane, 3,3,3-trifluoropropyltrimethoxysilane gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltrimethyoxysilane, gamma-aminopropyltrimethoxysilane, gamma-aminopropyltriethoxysilane, gamma-meraptopropyltrimethoxysilane, gamma-mercaptopropyltriethoxysilane, N-beta(aminoethyl)-gamma-aminopropyltrimethoxysilane, beta-cyanoethyltriethoxysilane and the like; as well as dialkoxysilanes or diacyloxysilanes such as dimethyldimethoxysilane, phenylmethyldimethoxysilane, dimethyldiethoxysilane, phenylmethyldiethoxysilane, gamma-glycidoxypropylmethyldimethoxysilane, gamma-glycidoxypropylmethyldiethoxysilane, gamma-glycidoxypropylphenyldimethoxysilane, gamma-glycidoxypropylphenyldiethoxysilane, gamma-chloropropylmethyldimethoxysilane, gamma-chloropropylmethyldiethoxysilane, dimethyldiacetoxysilane, gamma-methacryloxypropylmethyldimethoxysilane, gamma-metacryloxypropylmethyldiethoxysilane, gamma-mercaptopropylmethyldimethoxysilane, gamma-mercaptopropylmethyldiethoxysilane, gamma-aminopropylmethyldimethoxysilane, gamma-aminopropylmethyldiethoxysilane, methylvinyldimethoxysilane, methylvinyldiethoxysilane and the like.

These organosilicon compounds can be used alone or in combination of two or more.

Also, various tetraalkoxysilanes and their hydrolyzates can be used in combination with the above organosilicon compounds, although they cannot be used as they are.

Examples of the tetraalkoxysilanes include methyl silicate, ethyl silicate, n-propyl silicate, isopropyl silicate, n-butyl silicate, sec-butyl silicate and tert-butyl silicate.

The above organosilicon compounds can be cured in the absence of catalyst, but various catalysts may be used to promote their curing.

As such catalysts, there can be used, for example, various acids and their salts including Lewis acids and their salts; metal salts, particularly alkali metal salts and ammonium salts of organic carboxylic acids, chromic acid, hypochlorous acid, boric acid, hydrobromic acid, selenious acid, thiosulfuric acid, orthosilicic acid, thiocyanic acid, nitrous acid, aluminic acid, carbonic acid and the like; and alkoxides of aluminum, zirconium or titanium, or their complex compounds.

The above mentioned organosilicon polymers may be used in combination with other organic substances. As such organic substances, there can be mentioned, for example, epoxy resins, acrylic copolymers and hydroxyl group-containing polymers (e.g. polyvinyl alcohol).

There are also be used, as a vehicle or excipient component, a sol of an inorganic oxide of Si, Al, Ti, Sb or the like, as disclosed in Optica Acta (p. 251, July 1982).

It is also possible to use a solvent and various additives for good storage and easy coating operation.

Thus, by providing, on the optical component, an abrasion resistance film comprising an organosilicon polymer and then providing thereon a multi-layered anti-reflection film, there can be obtained an anti-reflection optical element with improved mar resistance. In this case, by providing a foundation layer between the abrasion resistance film and the multi-layered anti-reflection film, the adhesion between the two films can be improved. As the foundation layer, there can be used a silicon dioxide film, for example, a vapor-deposited film obtained from $SiO_2$. It is also possible that a foundation layer be provided on the optical component and a multi-layered anti-reflection film be provided by the foundation layer.

Thus, by providing, on an optical component made of a plastic, a multi-layered film comprising at least one high refractive index film layer of mixed metal oxides comprising tantalum oxide, zirconium oxide and yttrium oxide, deposited by an evaporation process, there can be obtained an anti-reflection optical element of the present invention which is lightweight, has excellent impact resistance and excellent optical, mechanical and chemical properties, and has improved durability in said properties.

The present invention is described in more detail below by way of Examples.

EXAMPLE 1

(1) Preparation of an Optical Component

There were mixed and thoroughly stirred 100 parts by weight of m-xylylene diisocyanate, 142 parts by weight of pentaerythritol tetrakis(3-mercaptopropionate), 6 parts by weight of di-n-butyl phosphate, 0.25 part by weight of dibutyltin dilaurate and 0.5 part by weight of 2-(2'-hydroxy-5'-tert-octylphenyl)benzotriazole as an ultraviolet absorber. The mixture was deaerated for 60 minutes under vacuum (1 mmHg).

The deaerated mixture was casted into a mold assembly consisting of a glass-made mold for lens production and a resin-made gasket. The temperature of the mixture was then continuously elevated from 25° C. to 120° C. in 20 hours and kept at 120° C. for 2 hours to effect polymerization. After the completion of the polymerization, the gasket was removed and the mold and the formed polymer were separated to obtain a high refractive index polyurethane lens as an optical component.

The lens had a nd of 1.592 and a νd of 36 and thus had good optical properties.

(2) Formation of Abrasion Resistance Film 54 parts by weight of a 0.06 N aqueous HCl solution was dropwise added to 212 parts by weight of gamma-glycidoxypropyltrimethoxysilane with stirring. After the completion of the dropwise addition, stirring was effected for 24 hours to obtain a hydrolyzate.

Thereto were added 424 parts by weight of an antimony pentoxide sol (antimony pentoxide dispersion in methanol, average particle diameter = 10 nm, solid content = 30%) and 34 parts by weight of DENACOL EX-521 (epoxy compound, i.e. polyglycerol polyglycidyl ether manufactured by Nagase Kasei K.K.). The mixture was stirred for 5 hours. 6.8 parts by weight of dibutyltin laurate was added as a curing catalyst, and the resulting mixture was aged for 100 hours to obtain a coating solution.

The high refractive index polyurethane lens prepared above was dipped in a 10% aqueous NaOH solution of 50° C. for 5 minutes and then washed thoroughly. The resulting polyurethane lens was coated with the above coating solution according to a dipping method (pulling-up speed = 12 cm/min), heated at 120° C. for 1 hour to cure, then annealed to form an abrasion resistance film on the high refractive index polyurethane lens.

(3) Formation of Foundation Layer and Multi-Layered Anti-Reflection Film

Sintered $SiO_2$ was used as a material for vapor-deposited foundation layer or vapor-deposited low refractive index film layer. As a material for vapor-deposited high refractive index material film layer, there was used pellets obtained by mixing a $ZrO_2$ powder, a $Ta_2O_5$ powder and a $Y_2O_3$ powder at a molar ratio of 1:1.3:0.2, press-molding the mixture, sintering the mold at 1,200° C. and pelletizing the sintered material. The polyurethane lens having an abrasion resistance film thereon, obtained in (2) above was placed in a chamber for vapor deposition, and heated to 85° C. while the chamber inside was made vacuum to $2 \times 10^{-5}$ Torr. Then, the above materials were vapor-deposited in order by an electron beam heating method, whereby as shown in Table 1, there was firstly formed a foundation layer consisting of a silicon dioxide and then there were formed a first low refractive index film layer consisting of a composite equivalent film of a mixed material and a silicon oxide, a second high refractive index film layer consisting of a mixed material and a third low refractive index film layer consisting of silicon dioxide in this order to obtain a multi-layered anti-reflection film on the foundation layer.

Incidentally, the foundation layer is desirable because it can increase adhesion of the anti-reflection film to the optical component.

TABLE 1

| Vapor-deposited layer or film | | Refractive | Optical film |
|---|---|---|---|
| Type | Composition | index | thickness |
| Foundation layer | Silicon dioxide | 1.46 | 0.6λ |
| Multi-layered anti-reflection film | | | |
| First low refractive index film layer* | Mixed material<br>Silicon dioxide | 2.05<br>1.46 | 0.056λ<br>0.075λ |
| Second high refractive index film layer | Mixed material | 2.05 | 0.46λ |
| Third low refractive index film layer | Silicon dioxide | 1.46 | 0.25λ |

*This is a two-layered composite equivalent film.

The above-obtained anti-reflection high refractive index plastic lens was measured for absorption ratios at wavelength region of visible light. The results are shown in Table 2. Incidentally, the absorption ratio (%) in Table 2 was obtained by measuring the reflectances (R) and transmittances (T) of said anti-reflection high refractive index plastic lens at various wavelengths between 380 nm and 780 nm by a recording spectrophotometer (Model 340 manufactured by Hitachi, Ltd.) and using the following formula.

$$\text{Absorption ratio (\%)} = 100 - (R + T)$$

As is clear from Table 2, the anti-reflection high refractive index plastic lens obtained in this Example shows low absorption ratios over the entire wavelength region of visible light and has excellent optical properties.

Further, in order to evaluate the mechanical and chemical properties, the above plastic lens was measured for appearance, luminous reflectance, mar resistance, impact resistance, adhesion, heat resistance, alkali resistance, acid resistance and weather resistance according to the following test methods.

Appearance

Whether or not the lens satisfied the following four requirements was visually examined using a luminaire employing a fluorescent lamp as a light source.
(1) The lens is transparent.
(2) The lens surface has no irregularity.
(3) The lens has no stria.
(4) The lens surface has no foreign matter and no mar.

Luminous Reflectance

The lens was measured for reflectance at a wavelength region of 380–780 nm using a recording spectrophotometer (Model 340 manufactured by Hitachi, Ltd.), and there was obtained a luminous reflectance of the lens from the reflectance and the luminous efficacy curve.

Mar Resistance

The lens was visually examined for extent of mar when the surface of its multi-layered anti-reflection film was rubbed with a steel wool #0000. The following evaluation criterion was used.
A: Substantially no mar when rubbed strongly.
B: Fairly severe mar when rubbed strongly.
C: About the same severe mar as on the lens substrate (optical component) when rubbed strongly.

Impact resistance

A 16-g steel ball was dropped on the center of the anti-reflection high refractive index plastic lens from a height of 127 cm to examine the extent of lens breakage.

Adhesion

The surface of the anti-reflection high refractive index plastic lens was cross-cut at intervals of 1 mm; a cellophane tape was strongly attached thereon; the tape was peeled rapidly; thereby, the extent of peeling of the multi-layered anti-reflection film, foundation layer and abrasion resistance film of the lens was examined.

Heat Resistance

The anti-reflection high refractive index plastic lens was placed in an oven for 1 hour to examine the formation of cracks. Heating was started from 70° C., the oven inside temperature was increased at intervals of 5° C., and the temperature of first crack appearance was examined, and the level of that temperature was used as a yardstick of heat resistance.

Alkali Resistance

The anti-reflection high refractive index plastic lens was immersed in a 10 wt. % aqueous NaOH solution for 24 hours to observe the corrosion state on the multi-layered anti-reflection film of the lens.

Acid Resistance

The anti-reflection high refractive index plastic lens was immersed in a 10 wt. % aqueous HCl solution and a 10 wt. % aqueous $H_2SO_4$ solution for 24 hours to observe the corrosion state on the multi-layered anti-reflection film of the lens.

Weather Resistance

The anti-reflection high refractive index plastic lens was subjected to outdoor exposure for one month, and the resulting lens was evaluated or measured for appearance, luminous reflectance, mar resistance, impact resistance, adhesion, heat resistance, alkali resistance and acid resistance according to the same test methods as given above.

As a result, it was confirmed that the anti-reflection high refractive index plastic lens of the present Example 1 gave good evaluation or measurement results in all the test items and was excellent in optical, mechanical and chemical properties as well as in durabilities of the same test items.

Of these results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same 8 test items after one-month outdoor exposure are shown in Table 4.

EXAMPLES 2-9

Eight polyurethane lenses each having an abrasion resistance film thereon were prepared in the same manner as in Example 1. On each abrasion resistance film was formed a foundation layer in the same manner as in Example 1. Then, on each foundation layer was formed a multi-layered anti-reflection film having the same constitution as the multi-layered anti-reflection film of Example 1, except that in the formation of the mixed material film constituting the first low refractive index film layer (two-layered composite equivalent film) as well as in formation of the second high refractive index film layer of mixed material, the molar ratios of $ZrO_2$ powder. $Ta_2O_5$ powder and $Y_2O_3$ powder used as mixed raw materials were changed from 1:1.3:0.2 (Example 1) to 1:1:0.1 (Example 2), 1:1:0.2 (Example 3), 1:1:0.3 (Example 4), 1:1.3:0.1 (Example 5), 1:1.3:0.3 (Example 6), 1:1.5:0.1 (Example 7), 1:1.5:0.2 (Example 8) and 1:0.5:0.3 (Example 9).

The thus obtained anti-reflection high refractive index plastic lenses were measured for absorption ratios at a wavelength region of visible light. All the lenses obtained in Examples 2-9 showed low absorption ratios over the entire wavelength of visible light and had excellent optical properties. All the measurement results are listed in Table 2.

These lenses were evaluated and measured for appearance, luminous reflectance, mar resistance, impact resistance, adhesion, heat resistance, alkali resistance, acid resistance and weather resistance in the same manner as in Example 1. All of the lenses gave good results in each test item and were excellent in optical, mechanical and chemical properties as well as in durabilities in said test items.

EXAMPLE 10

An anti-reflection high refractive index plastic lens was prepared in the same manner as in Example 1 except that a coating solution for abrasion resistance film was obtained as follows. That is, 54 parts by weight of a 0.06 N aqueous HCl solution was dropwise added to 212 parts by weight of gamma-glycidoxypropyltrimethoxysilane with stirring. After the completion of the dropwise addition, stirring was effected for 24 hours to obtain a hydrolyzate. There were added 424 parts by weight of an antimony pentoxide sol (antimony pentoxide dispersion in methanol, average particle diameter =10 nm, solid content=30%), 68 parts by weight of DENACOL EX-521 (epoxy compound, i.e. polyglycerol polyglycidyl ether manufactured by Nagase Kasei K.K.) and 34 parts by weight of titanium isopropoxyoctylene glycolate. The mixture was stirred for 100 hours for aging to obtain a coating solution.

The resulting anti-reflection high refractive index plastic lens was measured for absorption ratios at various wavelengths of visible light in the same manner as in Example 1. The lens showed low absorption ratios at the entire wavelength region of visible light and had excellent optical properties. The measurement results are shown in Table 2.

The lens was also evaluated and measured for appearance, luminuous reflectance, mar resistance, impact resistance, adhesion, heat resistance, alkali resistance, acid resistance and weather resistance in the same manner as in Example 1. Good evaluation and measurement results were obtained in all the test items, and the lens was superior in optical, mechanical and chemical properties as well as in durabilities in said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 11

(1) Preparation of Optical Component

| | |
|---|---|
| m-Xylylene diisocyanate (hereinafter referred to as m-XDI) | 484 parts by weight |
| Pentaerythritol tetrakis(mercaptopropionate) (hereinafter referred to as PETMP) | 305 parts by weight |
| Dimercaptopropanol (hereinafter referred to as DMP) | 103 parts by weight |
| Dibutytin dilaurate (polymeriztion catalyst) (hereinafter referred to as DBTL) | 0.5 part by weight |

The mixture of the above four materials was stirred at room temperature for 30 minutes and deaerated for 60 minutes under vacuum (1 mmHg). The resulting mixture was cast into a mold assembly consisting of a glass-made mold and a polyethylene gasket, and was polymerized by heating it at 25° C. for 5 hours, at 40° C. for 5 hours, at 60° C. for 7 hours, at 80° C. for 3 hours and at 120° C. for 2 hours. The resulting lens was taken out of the mold assembly.

The lens had a nd of 1.61 and a νd of 36 and thus had good optical properties.

(2) Formation of Abrasion Resistance Film

An abrasion resistance film was formed on the lens obtained in (1) above, in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film formed in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties. The measurement results are shown in Table 2.

The lens were also evaluated and measured for appearance, luminous reflectance, mar resistance, impact resistance, adhesion, heat resistance, alkali resistance, acid resistance and weather resistance in the same manner as in Example 1. Good evaluation and measurement results were obtained in all the test items, and the lens was superior in optical, mechanical and chemical properties as well as in durabilities in said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 12

(1) Preparation of optical component

| | |
|---|---|
| m-XDI | 484 parts by weight |
| PETMP | 427 parts by weight |
| DMP | 62 parts by weight |
| DBTL | 0.5 part by weight |

Using the above four materials, there was prepared an optical component in the same manner as in Example 1.

The resulting lens had a nd of 1.60 and a νd of 36 and had good optical properties.

(2) Formation of abrasion resistance film

An abrasion resistance film was formed on the lens obtained in (1) above, in the same manner as in Example 1 except that there was used, as an optical component, the lens obtained in (1) above.

Formation of Foundation Layer and Multi-Layered Anti-Reflection Film

A foundation layer and a multi-layered anti-reflection film were formed in this order on the abrasion resistance layer obtained in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties.

The lens were also evaluated and measured for appearance, luminous reflectance, mar resistance, impact resistance, adhesion, heat resistance, alkali resistance, acid resistance and weather resistance in the same manners as in Example 1. Good evaluation and measurement results were obtained in all the test items, and the lens was superior in optical, mechanical and chemical properties as well as in durabilities in said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 13

(1) Preparation of Optical Component

| | |
|---|---|
| Tetramethylxylylene diisocyanate (hereinafter referred to as TMXDI) | 1,257 parts by weight |
| PETMP | 610 parts by weight |
| Monothioglycerol (hereinafter referred to as TG) | 180 parts by weight |
| Formate TK-1 (polymerization catalyst manufactured by Takeda Chemical Industries, Ltd.) | 0.5 part by weight |

Using the above materials, there was prepared an optical component in the same manner as in Example 1.

The lens had a nd of 1.57 and a νd of 39 and had good optical properties.

(3) Formation of Abrasion Resistance Film

An abrasion resistance film was formed on the lens obtained in (1) above in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film obtained in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manners as in Example 1. Good evaluation and measurement results were obtained in all the test items, and the lens was superior in optical, mechanical and chemical properties as well as in durabilities in said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 14

(1) Preparation of Optical Component

| | |
|---|---|
| TMXDI | 1,257 parts by weight |
| PETMP | 732 parts by weight |
| TG | 144 parts by weight |
| Formate TK-1 | 0.5 part by weight |

Using the above materials, there was prepared an optical component in the same manner as in Example 1.

The lens had a nd of 1.57 and νd of 39 and had good optical properties.

(2) Formation of Abrasion Resistance Film

An abrasion resistance film was formed on the lens obtained in (1) above in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film obtained in (2) above, in the same manner as in Example 1.

The resulting anti-reflection high refractive index plastic lens was measured for absorption ratios at various wavelengths of visible light in the same manner as in Example 1. The lens showed low absorption ratios in the entire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manner as in Example 1. Good evaluation and measurement results were obtained in all the test items, and the lens was superior in optical, mechanical and chemical properties as well as in durabilities in said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 15

(1) Preparation of Optical Component

| TMXDI | 1,257 parts by weight |
|---|---|
| PETMP | 854 parts by weight |
| TG | 108 parts by weight |
| Formate TK-1 | 0.5 part by weight |

Using the above materials, there was prepared an optical component (lens).

The lens had a nd of 1.57 and a νd of 39 and had good optical properties.

(2) Formation of Abrasion Resistance Film

An abrasion resistance film was formed on the lens obtained in (1) above in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film obtained in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manners as in Example 1. Good evaluation and measurement results were obtained in all the test items, and the lens was superior in optical, mechanical and chemical properties as well as in durabilities of said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 16

(1) Preparation of Optical Component

| m-XDI | 484 parts by weight |
|---|---|
| PETMP | 305 parts by weight |
| TG | 90 parts by weight |
| DBTL | 0.3 part by weight |

Using the above materials, there was prepared an optical component (lens).

The lens had a nd of 1.59 and a νd of 36 and had good optical properties.

(2) Formation of abrasion resistance film

An abrasion resistance film was formed on the lens obtained in (1) above, in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film formed in (2) above, in the same manner as in Example 1.

The resulting anti-reflection high refractive index plastic lens was measured for absorption ratios at various wavelengths of visible light in the same manner as in Example 1. The lens showed low absorption ratios at the en&ire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manner as in Example 1. Good evaluation and measurement results were obtained in all the test items, and the lens was superior in optical, mechanical and chemical properties as well as in durabilities in said test items.

Of these evaluation and measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 17

(1) Preparation of Optical Component

| m-XDI | 484 parts by weight |
|---|---|
| PETMP | 366 parts by weight |
| TG | 72 parts by weight |
| DBTL | 0.3 part by weight |

Using the above materials, there was prepared an optical component (lens) in the same manner as in Example 1.

The lens had a nd of 1.59 and a νd of 36 and had good optical properties.

(2) Formation of Abrasion Resistance Film

An abrasion resistance film was formed on the lens obtained in (1) above, in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film formed in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manners as in Example 1. Good evaluation and measurement results were obtained in all the test items, and the lens was superior in optical, mechanical and chemical properties as well as in durabilities of said test items.

Of these evaluation and measurement results, the results of 8 test items, i.e. appearance, luminous reflectance, mar resistance, impact resittance, adhesion, heat resistance, alkali resistance and acid resistance are shown in Table 3; and the results of weather resistance, i.e. the results of the same test items after one-month outdoor exposure are shown in Table 4.

EXAMPLE 18

(1) Preparation of Optical Component

| | |
|---|---|
| m-XDI | 484 parts by weight |
| PETMP | 427 parts by weight |
| TG | 54 parts by weight |
| DBTL | 0.3 part by weight |

Using the above materials, there was prepared an optical component (lens) in the same manner as in Example 1.

The lens had a nd of 1.59 and a νd of 36 and had good optical properties.

(2) Formation of Abrasion Resistance Film

An abrasion resistance film was formed on the lens obtained in (1) above, in the same manner as in Example 1 except that there was used, as an optical component, the lens obtained in (1) above.

(3) Formation of Foundation Layer and Multi-Layered Anti-Reflection Film

A foundation layer and a multi-layered anti-reflection film were formed in this order on the abrasion resistance film obtained in (2) above, in the same manner as in Example 1.

The resulting anti-reflection high refractive index plastic lens was measured for absorption ratios at various wavelengths of visible light in the same manner as in Example 1. The lens showed low absorption ratios at the entire wavelength region of visible light and had excellent optical properties.

The lens was also evaluated and measured for appearance, luminous reflectance, mar resistance, impact resistance, adhesion, heat resistance, alkali resistance, acid resistance and weather resistance in the same manners as in Example 1. Good evaluation and measurement results were obtained in all the test items, and the lens was superior in optical, mechanical and chemical properties as well as in durabilities of said test items.

Of these evaluation or measurement results, the results of 8 test items, i.e. appearance, luminous reflectance, mar resistance, impact resistance, adhesion, heat resistance, alkali resistance and acid resistance are shown in Table 3; and the results of weather resistance, i.e. the results of the same test items after one-month outdoor exposure are shown in Table 4.

EXAMPLE 19

(1) Preparation of Optical Component

A monomer mixture was prepared by mixing 30 parts by weight of diethylene glycol bis(allyl carbonate) (DAC), 20 parts by weight of benzyl methacrylate, 45 parts by weight of diallyl terephthalate, 5 parts by weight of methyl methacrylate and 3 parts by weight of diisopropyl peroxycarbonate (polymerization initiator). This monomer mixture contained no releasing agent. The mixture was poured into a mold assembly consisting of two glass molds and a resin gasket. In this case, the monomer mixture adhered to the outer surfaces of the molds. The mixture was heated from 40° C. to 90° C. in 4 hours to polymerize the monomers. As a result of the polymerization procedure, the monomer mixture adhering to the outer surfaces of the molds caused partial polymerization and became a viscous fluid. Then, the gasket was removed and the molds were immersed in a methylene chloride-alkali mixed cleaning solution to remove the viscous fluid adhering to the outer surfaces of the molds. The adhesion between the molds and the copolymers obtained was good; therefore, there was no separation of the molds and the copolymer and accordingly no penetration of the cleaning solution between the molds and the copolymer. The plastic lens consisting of a cured quadripolymer was taken out of the molds and then heat-treated at 120° C. for 1 hour.

The plastic lens had a nd of 1.549, was free from cloudiness, surface roughening and stria, and was suitable for use as such.

(2) Formation of Abrasion Resistance Film

A coating solution comprising, as silicon compounds, 80 mole % of colloidal silica and 20 mole % of gamma-glycidoxypropyltrimethoxysilane was coated on the surface of the lens obtained in (1) above to form an abrasion resistance film.

(3) Formation of Foundation Layer and Multi-Layered Anti-Reflection Film

A foundation layer and a multi-layered anti-reflection film were formed in this order on the abrasion resistance film formed in (2) above, in the same manner as in Example 1.

The thus obtained anti-reflection plastic lens was measured for reflectances at both sides of lens at a wavelength region of 380-780 nm, using a recording spectrophotometer (Model 340 manufactured by Hitachi, Ltd.). The lens had excellent anti-reflection properties as shown in the spectral reflectance curve of FIG. 1.

The lens was also evaluated and measured for appearance, mar resistance, adhesion, heat resistance, alkali resistance, acid resistance and weather resistance in the same manners as in Example 1. The results were good in all the test items, and the lens was superior in optical, mechanical and chemical properties as well as in durabilities in said test items. Incidentally, in this Example, acid resistance was evaluated by immersing the lens in a 10 wt. % aqueous HCl solution and a 10 wt. % aqueous $H_2SO_4$ solution for 3 hours to observe the corrosion condition on the multi-layered anti-reflection film of the lens.

Of these evaluation or measurement results, the results of 6 test items, i.e. appearance, mar resistance, adhesion, heat resistance, alkali resistance and acid resistance are shown in Table 3; and the results of weather resistance, i.e. the results of the same test items after one-month outdoor exposure are shown in Table 4.

ing a nd of 1.499. On the surface of this plastic lens were formed a foundation layer and a multi-layered anti-reflection film in the same manners as in Example 1.

Figure 2:
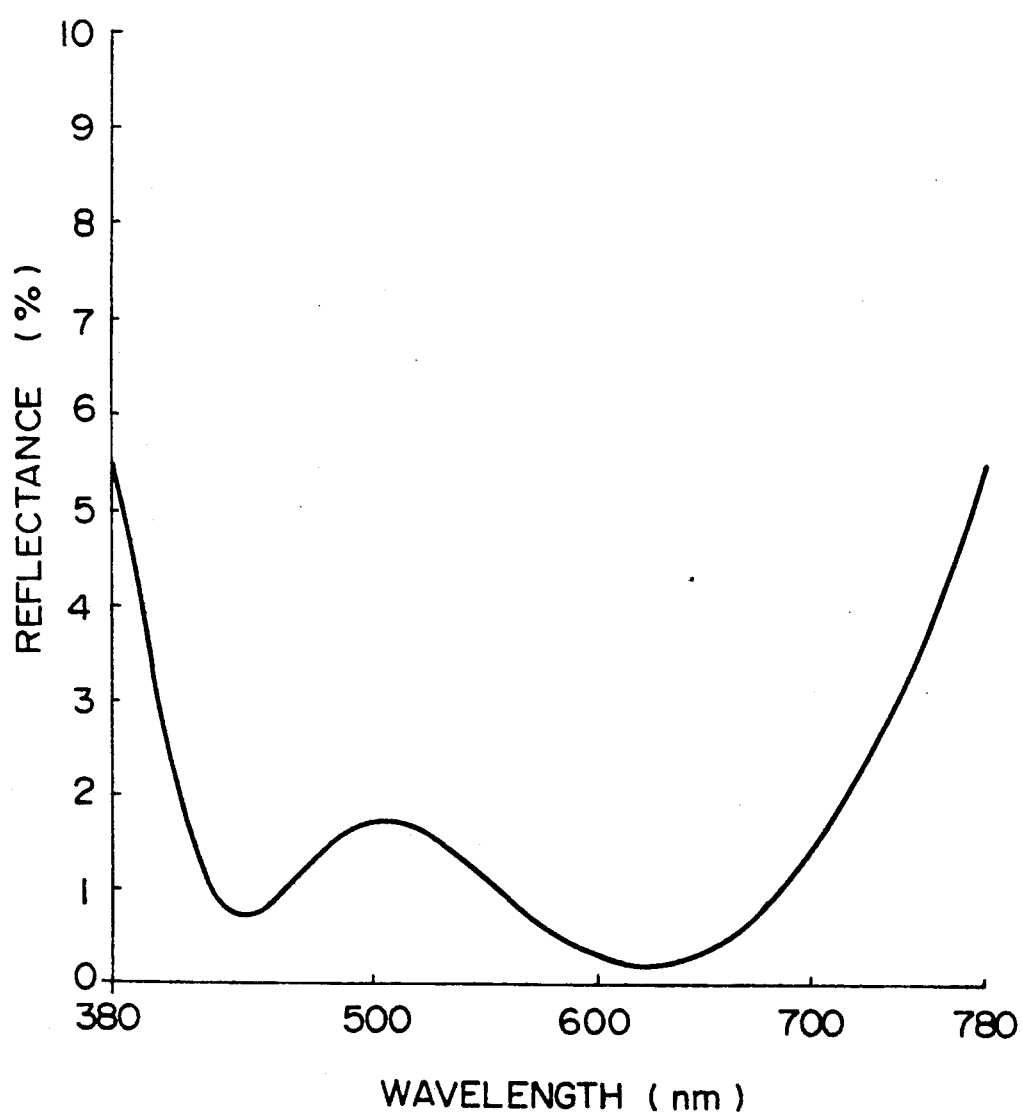
FIG. 2 shows a spectral reflectance curve of the anti-reflection optical element obtained in Example 20.

The thus obtained anti-reflection plastic lens was measured for reflectances at both sides of lens at a wavelength region of 380–780 nm in the same manner as in Example 19. As shown in the spectral reflectance curve of FIG. 2, the lens had excellent anti-reflection properties.

The lens was also measured for appearance, mar resistance, heat resistance, alkali resistance, acid resistance and weather resistance in the same manners as in Example 1. Good evaluation and measurement results were obtained in all the test items, and the lens was superior in optical, mechanical and chemical properties as well as in durabilities in said test items.

Of these evaluation or measurement results, the results of 6 test items, i.e. appearance, mar resistance, adhesion, heat resistance, alkali resistance and acid resistance are shown in Table 3; and the results of weather resistance, i.e. the results of the same test items after one-month outdoor exposure are shown in Table 4.

TABLE 2

| Example | Molar ratio of mixed material* | | | Absorption ratios (%) at various wavelengths (mm) | | | | | | |
|---|---|---|---|---|---|---|---|---|---|---|
| | $ZrO_2$ | $Ta_2O_5$ | $Y_2O_3$ | 400 | 450 | 500 | 550 | 600 | 650 | 700 |
| 1 | 1 | 1.3 | 0.2 | 0.8 | 0.3 | 0.3 | 0.3 | 0.3 | 0.1 | 0.0 |
| 2 | 1 | 1 | 0.1 | 1.4 | 0.5 | 0.5 | 0.5 | 0.4 | 0.2 | 0.0 |
| 3 | 1 | 1 | 0.2 | 1.3 | 0.5 | 0.5 | 0.4 | 0.3 | 0.3 | 0.1 |
| 4 | 1 | 1 | 0.3 | 1.3 | 0.4 | 0.4 | 0.3 | 0.3 | 0.2 | 0.0 |
| 5 | 1 | 1.3 | 0.1 | 1.5 | 0.6 | 0.5 | 0.5 | 0.4 | 0.1 | 0.1 |
| 6 | 1 | 1.3 | 0.3 | 0.7 | 0.4 | 0.3 | 0.2 | 0.3 | 0.2 | 0.1 |
| 7 | 1 | 1.5 | 0.1 | 1.7 | 0.9 | 0.6 | 0.5 | 0.4 | 0.4 | 0.0 |
| 8 | 1 | 1.5 | 0.2 | 1.2 | 0.7 | 0.6 | 0.5 | 0.4 | 0.4 | 0.3 |
| 9 | 1 | 1.5 | 0.3 | 1.2 | 0.5 | 0.4 | 0.3 | 0.3 | 0.4 | 0.1 |
| 10 | 1 | 1.3 | 0.2 | 0.9 | 0.3 | 0.3 | 0.3 | 0.3 | 0.2 | 0.0 |
| 11 | 1 | 1.3 | 0.2 | 0.8 | 0.3 | 0.3 | 0.3 | 0.3 | 0.1 | 0.0 |

*Refers to the molar ratio of the mixed material used for the formation of a high refractive index vapor-deposited film layer constituting a multi-layered anti-reflection film.

TABLE 3

| | | Test results before outdoor exposure | | | | | | |
|---|---|---|---|---|---|---|---|---|
| Example | Appearance | Luminous reflectance (%) | Mar resistance | Impact resistance | Adhesion | Heat resistance (°C.) | Alkali resistance | Acid resistance |
| 1 | Good | 1.5 | A*1 | ○*2 | ○*3 | 90 | ○*4 | ○*5 |
| 10 | Good | 1.5 | A | ○ | ○ | 90 | ○ | ○ |
| 11 | Good | 1.5 | A | ○ | ○ | 90 | ○ | ○ |
| 12 | Good | 1.5 | A | ○ | ○ | 90 | ○ | ○ |
| 13 | Good | 1.5 | A | ○ | ○ | 90 | ○ | ○ |
| 14 | Good | 1.5 | A | ○ | ○ | 90 | ○ | ○ |
| 15 | Good | 1.5 | A | ○ | ○ | 90 | ○ | ○ |
| 16 | Good | 1.5 | A | ○ | ○ | 90 | ○ | ○ |
| 17 | Good | 1.5 | A | ○ | ○ | 90 | ○ | ○ |
| 18 | Good | 1.5 | A | ○ | ○ | 90 | ○ | ○ |
| 19 | Good | — | A | — | ○ | 90 | ○ | ○ |
| 20 | Good | — | A | — | ○ | 90 | ○ | ○ |

*1 A indicates that there appears substantially no mar when strong rubbing has been applied.
*2 ○ indicates that dropping of steel ball causes no lens breakage.
*3 ○ indicates no peeling.
*4 ○ indicates no corrosion.
*5 ○ indicates no corrosion.

EXAMPLE 20

As an optical component (lens), there was used a plastic lens composed mainly of a DAC resin and hav-

TABLE 4

| | | Test results after one-month outdoor exposure | | | | | | |
|---|---|---|---|---|---|---|---|---|
| Example | Appearance | Luminous reflectance (%) | Mar resistance | Impact resistance | Adhesion | Heat resistance (°C.) | Alkali resistance | Acid resistance |
| 1 | Good | 1.5 | A*1 | ○*2 | ○*3 | 90 | ○*4 | ○*5 |
| 10 | Good | 1.5 | A | ○ | ○ | 90 | ○ | ○ |
| 11 | Good | 1.5 | A | ○ | ○ | 90 | ○ | ○ |

TABLE 4-continued

| | | Test results after one-month outdoor exposure | | | | | | |
|---|---|---|---|---|---|---|---|---|
| Example | Appearance | Luminous reflectance (%) | Mar resistance | Impact resistance | Adhesion | Heat resistance (°C.) | Alkali resistance | Acid resistance |
| 12 | Good | 1.5 | A | ○ | ○ | 90 | ○ | ○ |
| 13 | Good | 1.5 | A | ○ | ○ | 90 | ○ | ○ |
| 14 | Good | 1.5 | A | ○ | ○ | 90 | ○ | ○ |
| 15 | Good | 1.5 | A | ○ | ○ | 90 | ○ | ○ |
| 16 | Good | 1.5 | A | ○ | ○ | 90 | ○ | ○ |
| 17 | Good | 1.5 | A | ○ | ○ | 90 | ○ | ○ |
| 18 | Good | 1.5 | A | ○ | ○ | 90 | ○ | ○ |
| 19 | Good | — | A | — | ○ | 90 | ○ | ○ |
| 20 | Good | — | A | — | ○ | 90 | ○ | ○ |

*1 A indicates that there appears substantially no mar when strong rubbing has been applied.
*2 ○ indicates that dropping of steel ball causes no lens breakage.
*3 ○ indicates no peeling.
*4 ○ indicates no corrosion.
*5 ○ indicates no corrosion.

As described above, the anti-reflection optical element of the present invention is superior in optical, mechanical and chemical properties as well as in durabilities of said properties.

Accordingly, by effecting the present invention, there can be obtained an anti-reflection optical element which can maintain optical properties at high levels over a long period of time and which is lightweight.

What is claimed is:

1. An anti-reflection optical element comprising (i) an optical component made of a plastic and (ii) a multi-layered anti-reflection film provided directly or indirectly on said optical component, said film comprising at least one low refractive index film layer and at least one high refractive index film layer, said low refractive index film layer and said high refractive index film layer being laminated alternately on said optical component, said high refractive index film layer being a film of mixed metal oxides comprising tantalum oxide, zirconium oxide and yttrium oxide, deposited by evaporation process.

2. An anti-reflection optical element according to claim 1, wherein an abrasion resistance film is provided between the optical component and the multi-layered anti-reflection film.

3. An anti-reflection optical element according to claim 2, wherein a foundation layer is provided between the abrasion resistance film and the multi-layered anti-reflection film.

4. An anti-reflection optical element according to claim 2, wherein the abrasion resistance film contains an organosilicon polymer.

5. An anti-reflection optical element according to claim 1, wherein a foundation layer is provided between the optical component and the multi-layered anti-reflection film.

6. An anti-reflection optical element according to claim 5, wherein the foundation layer is a vapor-deposited film consisting of a silicon dioxide.

7. An anti-reflection optical element according to claim 1, wherein the high refractive index film layer is obtained from a mixed material comprising $ZrO_2$, $Ta_2O_5$ and $Y_2O_3$ at a molar ratio of 1:0.8–1.5:0.05–0.3 according to a vapor deposition method.

8. An anti-reflection optical element according to claim 1, wherein the plastic is a polyurethane obtained by polymerizing a polyisocyanate and at least one compound selected from compounds having two or more mercapto groups, compounds having two or more hydroxyl groups and compounds having one or more mercapto groups and one or more hydroxyl groups.

9. An anti-reflection optical element according to claim 8, wherein the compounds having one or more mercapto groups and one or more hydroxyl groups are each a compound having p hydroxyl groups (p is 0 or an integer of 1 or more) and q mercapto groups (q is an integer of 1 or more) wherein the sum of the number of hydroxyl groups and the number of the mercapto groups, (p+q) is 3 or more, and 6 or less carbon atoms exist between the furthest two of said groups (furthest two hydroxyl groups, furthest two mercapto groups or furthest hydroxyl and mercapto groups).

10. An anti-reflection optical element according to claim 1, wherein the plastic is a polymer of diethylene glycol bis(allyl carbonate).

11. An anti-reflection optical element according to claim 1, wherein the plastic is a copolymer of diethylene glycol bis(allyl carbonate) and at least one monomer selected from benzyl (meth)acrylate, diallyl tere- and/or isophthalate and methyl (meth)acrylate.

* * * * *